US008495648B1

(12) United States Patent
Brandwine et al.

(10) Patent No.: US 8,495,648 B1
(45) Date of Patent: Jul. 23, 2013

(54) MANAGING ALLOCATION OF COMPUTING CAPACITY

(75) Inventors: Eric Jason Brandwine, Haymarket, VA (US); James Alfred Gordon Greenfield, Western Cape (ZA); Diwakar Gupta, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 228 days.

(21) Appl. No.: 13/037,258

(22) Filed: Feb. 28, 2011

(51) Int. Cl.
*G06F 9/46* (2006.01)
(52) U.S. Cl.
USPC .......................................... 718/104; 709/226
(58) Field of Classification Search
USPC .......................................... 718/104; 709/226
See application file for complete search history.

(56) References Cited

U.S. PATENT DOCUMENTS

| 5,270,921 | A | * | 12/1993 | Hornick | 705/6 |
| 5,740,362 | A | * | 4/1998 | Buickel et al. | 709/201 |
| 2010/0169477 | A1 | * | 7/2010 | Stienhans et al. | 709/224 |
| 2010/0281166 | A1 | * | 11/2010 | Buyya et al. | 709/226 |

OTHER PUBLICATIONS

Wikipedia, "Weighted random early detection," http://en.wikipedia.org/wiki/Weighted_random_early_detection, dated Mar. 2, 2010, retrieved on May 25, 2011.
Wikipedia, "Random early detection," http://en.wikipedia.org/wiki/Random_early_detection, dated May 21, 2011, retrieved on May 25, 2011.

* cited by examiner

*Primary Examiner* — Emerson Puente
*Assistant Examiner* — Steven Do
(74) *Attorney, Agent, or Firm* — Knobbe, Martens, Olson & Bear LLP (57) ABSTRACT

Systems and methods are described for managing requests for computing capacity from a provider of computing resources. The computing resources may include program execution capabilities, data storage or management capabilities, network bandwidth, etc. In some implementations, user requests are probabilistically denied or granted while some computing resources are still available. By denying some requests or granting only some, the rate of computing resource usage can be reduced, thus preserving some capacity for a longer period of time. In one embodiment, the capacity can be provided to clients based on client priority, provided to clients with reserved resources, provided to clients probabilistically, sold on a spot market, or allocated in some other fashion.

35 Claims, 4 Drawing Sheets

MANAGING ALLOCATION OF COMPUTING CAPACITY

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers operated by a single organization and public data centers operated by third parties to provide computing resources to customers. Public and private data centers may provide network access, power, hardware resources (e.g., computing and storage), and secure installation facilities for hardware owned by the data center, an organization, or by other customers.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machine instances in a dynamic manner. In turn, users can request computer resources from a data center and be provided with varying numbers of virtual machine resources on an "as needed" basis or at least on an "as requested" basis.

As the scale and scope of data centers have increased, the task of provisioning, administering, and managing the physical and virtual computing resources of the data center has become increasingly complicated.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Embodiments of systems and methods are described for managing requests for computing capacity from a provider of computing resources. Illustratively, the computing resources may include program execution capabilities, data storage or management capabilities, network bandwidth, etc. However, at some point, the computing resources available to be provided to users can run out as computing resources are limited.

At that point, users' requests may be denied until further resources become available. In some implementation, user requests are probabilistically denied or granted while some computing resources are still available. By denying some requests or granting only some requests, the rate of computing resource usage can be reduced, thus preserving some capacity for a longer period of time. In one embodiment, the capacity can be provided to clients based at least in part on client priority, provided to clients with reserved resources, provided to clients probabilistically, sold on a spot market, or allocated in some other fashion.

By probabilistically determining whether to grant or deny a request, a computing service provider can respond shortly after receiving the request, in some embodiments almost immediately, thereby allowing the provider to remain responsive to user requests. While in one implementation, the computing resource provider could wait for an extended period of time while requests are received so that the provider has a better idea of what available capacity is, by waiting, the provider reduces its responsiveness to user requests, for example by increasing the latency of API calls, which may lead to user dissatisfaction with the provider.

In certain fee-based implementations, the provider of the computer resources may charge a reservation fee to the user for the request (e.g., when the request is granted) and/or a usage fee for providing use of the computer resources during time periods of low computer resources availability. Various types or tiers of fee arrangements are possible for prioritizing access to the computing resource. For example, computer resources may be requested for immediate use by the user ("on-demand resources"). In some such cases, the user might not pay a reservation fee but might pay higher usage fees. As another example, a user might reserve computer resources for guaranteed availability during a future usage period ("reserved resources"). The user might be charged a reservation fee for making the reservation and also charged a usage fee based on the amount of computer resources actually used during the usage period. In some such cases, the usage fee for the reserved resources may be discounted from the usage fee for on-demand resources and/or the reservation fee may be charged closer in time to the usage period rather than closer to the time the request was made. In another example, the computer resource provider may allow users to bid on unused computer resources ("spot resources"). In some such cases, the computer resource provider may set a spot price that changes based at least in part on supply and demand for the resources, and the resources may be made available to those users whose bid meets or exceeds the spot price. For example, the prices of resources may dynamically increase as the availability of the resource decreases and the prices may decrease as additional resources become available.

Various aspects of the disclosure will now be described with regard to certain examples and embodiments, which are intended to illustrate but not to limit the disclosure.

Figure 1:
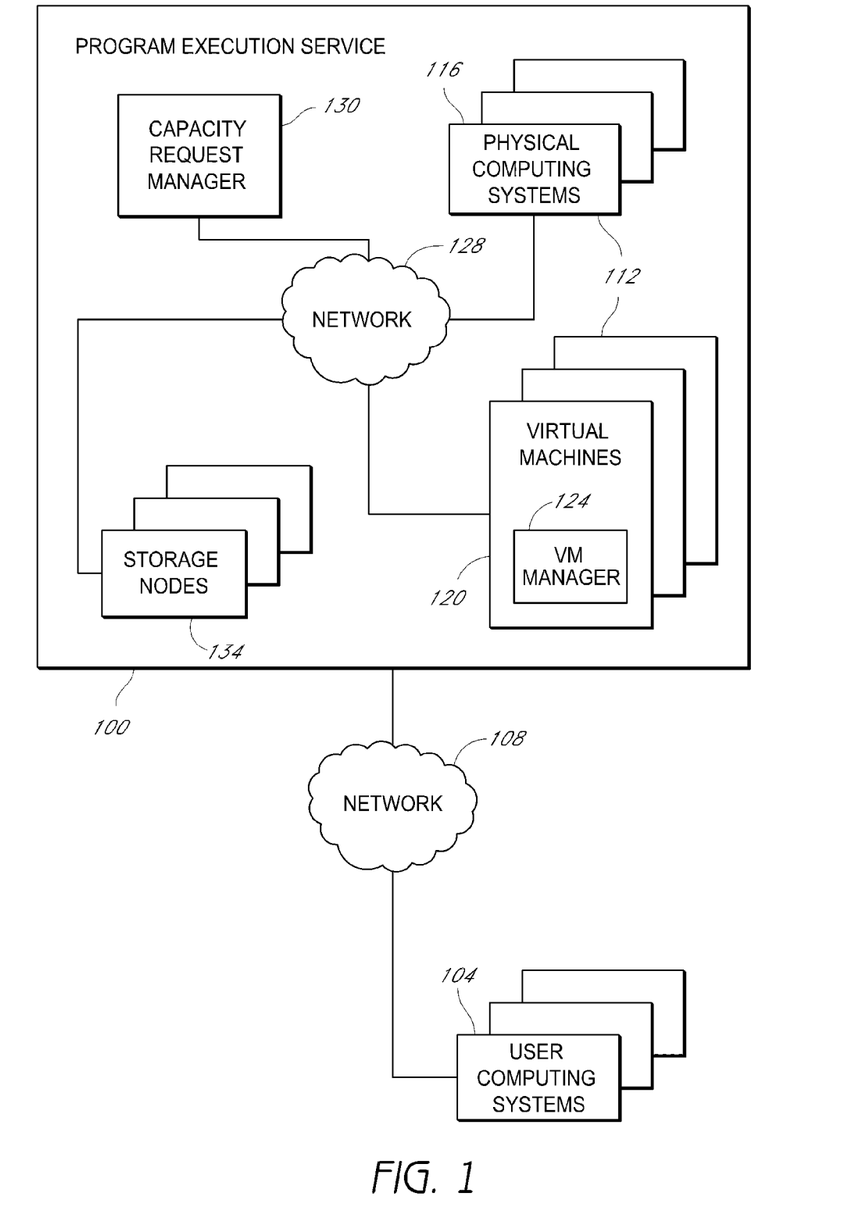
FIG. 1 is a network diagram schematically illustrating an example of a program execution service that can provide computing resources to multiple user computing systems via a communication network.

FIG. 1 is a network diagram schematically illustrating an example of a program execution service 100 that can provide computing resources to multiple user computing systems 104 via a communication network 108. For example, the program execution service 100 can manage requests from a user to execute a program, or set of programs, on behalf of the user. At least some of the user computing systems 104 may be remote from the program execution service 100. In this example, users can use the computing systems 104 to access the program execution service 100 over the communication network 108. The network 108 may, for example, be a publicly accessible network of linked networks, possibly operated by various distinct parties, such as the Internet. In other embodiments, the network 108 may be a private network, such as, for example, a corporate or university network that is wholly or partially inaccessible to non-privileged users. In still other embodiments, the network 108 may include one or more private networks with access to and/or from the Internet.

The program execution service 100 provides a variety of functionality for managing execution of programs for multiple users. In the example illustrated in FIG. 1, the program execution service 100 comprises a plurality of computing nodes 112 that can execute programs on behalf of the users. The computing nodes 112 may comprise one or more physical computing systems 116 and/or one or more virtual machines 120 that are hosted on one or more physical computing systems. For example, a host computing system may provide multiple virtual machines 120 and include a virtual machine ("VM") manager 124 to manage those virtual machines (e.g., a hypervisor or other virtual machine monitor).

In the example illustrated in FIG. 1, each of the computing nodes 112 has some amount of computing resources available for executing one or more programs. Each computing node 112 may be configured to provide a specific amount of program execution capacity, which may be measured, for example, by a combination of one or more of processing capacity (e.g., number and/or size of processing units), memory capacity, storage capacity, network bandwidth capacity, non-network communication bandwidth, etc. In some embodiments, the program execution service 100 may provide preconfigured computing nodes 112, with each preconfigured computing node having similar and/or equivalent amounts of resources available for executing programs on behalf of users. In other embodiments, the program execution service 100 may provide a selection of various different computing nodes 112 from which a user may choose for executing programs on behalf of the user. In some such embodiments, the computing nodes 112 may have varying amounts and/or types of computing resources (e.g., size, speed and/or type of processing units; number of processing units; amount of memory and/or storage; platform configuration, such as 32-bit or 64-bit, operating system, etc.).

The program execution service 100 may provide user computing systems 104 with access to storage nodes 134 that provide mass storage of data, programs, and other user information. The storage nodes 134 may comprise any type of persistent data storage, for example non-volatile memory devices such as, e.g., hard disk drives, optical disk drives, etc. In the example illustrated in FIG. 1, the computing nodes 112 can access the storage nodes 134 via a network 128. The network 128 may include multiple networking devices (not shown) such as, e.g., switches, edge routers, core routers, etc. The network 128 may, but need not be, a different network than the network 108 shown in FIG. 1.

Users of the program execution service 100 can interact with the program execution service 100 via a capacity request manager 130 to request preferred and/or required resources of the program execution service (e.g., program execution capacity and/or storage resources). The capacity request manager 130 can be connected to the computing nodes 112 and the storage nodes 134 via the network 128. The capacity request manager 130 can receive requests for computing resources from the user computing systems 104 over the network 108. A user may request via the capacity request manager 130 that the service 100 provide one or more computing nodes for execution of a program (or programs) on behalf of the user (or other users authorized by the user). In various embodiments, computing resources may be specified at the time of a request for execution of programs on behalf of a user and/or at one or more other times, such as when a user registers and/or subscribes to use services of the program execution service 100. In some embodiments, the capacity request manager 130 may provide subscription and/or registration services to one or more users, who may be customers of the program execution service, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the capacity request manager 130 to subscribe and/or register for services, the user may be issued one or more request identifiers (e.g., keys, tokens, user names, passwords, etc.) that are associated with the user and are to be used in conjunction with executing programs on behalf of the user. In other embodiments, a module other than the capacity request manager 130 may be provided to perform various operations related to subscription and/or registration services of the program execution service 100.

In some embodiments, the program execution service 100 may implement a management algorithm for determining whether to grant or deny a user request for computing resources. The program execution service may probabilistically determine whether to grant a request. For example, if resources fall below a first level or threshold, the program execution service 100 may begin denying requests probabilistically. The probability that the request is denied (or conversely, granted) can be based at least in part on availability of the computing resource. For example, if resources are very limited, then the probability of denying a request can be high, while if the resources are available in greater numbers, the probability of denying a request can be relatively lower. In some embodiments, the program execution service 100 may not deny requests if available resources are still plentiful or above a particular threshold. Once the available capacity is gone or falls below a second threshold (e.g., a reserve capacity level or other limit), then all requests may be denied. In some implementations, requests may be denied even if additional capacity still exists, for example, if a pool of capacity is being reserved for users with guaranteed service.

In one implementation, the probability of granting a request is determined using a probability function based at least partly on the available resources. For example, the probability function may be a linear function such as $Y=1-X$, where X is the ratio of allocated resources to total resources and Y is the probability that the request is granted. In one implementation, over at least a range of availability of the requested computing resources, the grant probability decreases as the availability of the requested computing resource decreases or the grant probability increases as the availability of the requested computing resource increases. The probability may become constant if the resources are above or below particular thresholds. For example, the probability function may return a probability of 100% if sufficient resources are available or a probability of 0% if no resources are available. As will be apparent, other types of functions may be used. For example, the probability function can include or utilize one or more of a binomial distribution, a Poisson distribution, a normal distribution, a random value function, or other function types.

In one implementation, the program execution service 100 may predict the number of expected requests and determine whether to grant a request based at least partly on the expected requests. Such predictions can be made using probabilistic or statistical models or be based at least partly on data collected about users' usage habits. For example, the program execution service 100 may expect that requests are more prevalent during certain times of the day or on certain days (e.g., during working hours or during business days) and thus be more aggressive in denying requests than at another time (e.g., during a weekend or after midnight), even if the nominal number of available resources are the same at both times. Thus, in one embodiment, the probability function used by the program execution service 100 may be adaptively changed based at least partly on the expected load of the system.

In some embodiments, the program execution service 100 may use a weighted probability function to determine whether to grant or deny a request. Particular requests may be given a higher priority and have a higher probability of being approved relative to other requests based at least partly on the characteristic of the request. For example, some users may have purchased quality of service agreements, purchased guaranteed capacity, requested capacity for execution of fee-based programs rather than free or demonstration programs, may have made future commitments to purchase extra capacity, or otherwise provided a higher priority relative to other customers. User data, such as payment history, usage history, age of a user account, amount of computing resources previously requested, user behavior, compliance with program execution service policies, user agreements with the program execution service, or other data associated with the user may be used by the program execution service 100 in determining a priority level for that user. Users may be categorized into any number of priority tiers, with higher tiers having higher probabilities of getting their request approved. In some embodiments, the requests are assigned to multiple priority queues managed by the program execution service 100. In one embodiment, short duration requests may be given a higher priority than longer duration requests, thus likely increasing the overall responsiveness of the program execution service 100 to user requests.

In an example two-tier program execution service 100, a regular priority request may have a 50% chance of being approved, while a high priority request may have a 75% chance of being approved. In one implementation, regular priority requests are assigned a weight of 1 while high priority requests have a weight of 1.5. This weight can be used by the capacity request manager 130 in probabilistically determining whether to grant the request, for example, by applying the weight as a parameter in a probability function used by the capacity request manager 130. Using the example weights, if the probability of granting a request is 50%, then a regular priority request with weight 1 would have a 1×50%=50% chance of being granted while a high priority requests with weight 1.5 would have a 1.5×50%=75% chance of being granted. Depending on the availability of resources in the example program execution service, the probabilities may change; however, the higher priority request generally gets an equal or greater probability of being granted than the regular priority request. Also, different ranges for the weight may also be used. For example, the weights may range from 0.0 to 1.0, with the weight applied as a parameter to a probability function.

In some embodiments, the capacity request manager 130 is executed or embodied by one or more physical or virtual computing systems. For example, in some embodiments, a server computing system that has components including a CPU, I/O components, storage, and memory may be used to execute the capacity request manager 130. The I/O components include a display, a network connection to the network 128, a computer-readable media drive, and other I/O devices (e.g., a keyboard, a mouse, speakers, etc.). An embodiment of the capacity request manager 130 can be stored as one or more executable program modules in the memory of the server, and the capacity request manager 130 can interact with computing nodes 112 (e.g., physical computing systems 116 and/or VMs 120) over the network 128. The capacity request manager 130 can receive requests from users for computing resources of the program execution service 100 via the network 108.

In some embodiments, such as in distributed systems, a program execution service 100 can have multiple capacity request managers 130. These capacity request managers 130 can be associated with one or more computing nodes or groups of computing nodes. In one embodiment, the capacity requests managers 130 operate independently of each other, determining whether to grant or deny requests independently. For example, when a request is received from a user, the program execution service 100 may select a capacity request manager 130 (e.g., randomly, through a hash function, or other selection algorithm) to fulfill the request. The capacity request manager 130 can determine whether to provision the request without necessarily knowing the status of other capacity request managers 130. By operating the capacity request managers 130 independently, the scalability of the program execution service 100 can be enhanced. For example, the desirability or need for centralized provisioning control or global monitoring of the current status of the entire system may be reduced or eliminated.

Figure 2A:
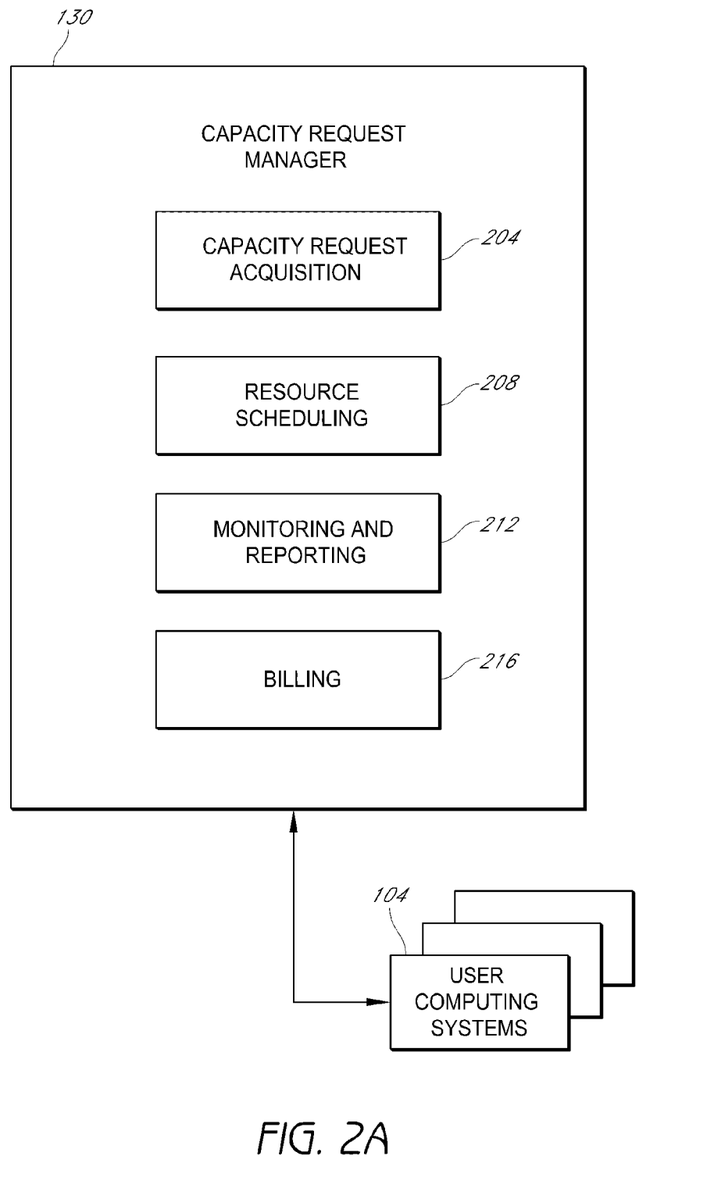
FIG. 2A is a block diagram schematic of illustrative components of a capacity request manager configured to manage requests for computing resources by users of a program execution service.

FIG. 2A is a block diagram schematic of illustrative components of an embodiment of the capacity request manager 130 that is configured for managing requests for execution of programs on behalf of users. In this embodiment, the capacity request manager includes a capacity request acquisition module 204, a resource scheduling module 208, monitoring and reporting module 212, and billing module 216.

The capacity request acquisition module 204 receives requests from users for computing resources of the program execution service 100. The user may request that program execution capacity be made available immediately, may request that program execution capacity be initiated at a future time, or may request program execution capacity be guaranteed available based at least partly on other criteria. Requests for program execution capacity may be received by the capacity request acquisition module 204 in various ways. For example, a request can be received directly from a user (e.g., via an interactive console or other GUI provided by the program execution service), from an executing program of a user that automatically initiates the execution of other programs or other instances of itself, from a program that interacts with the capacity request manager via an Application Programming Interface ("API") provided by the program execution service (e.g., an API that uses Web services), and so forth.

Requests for computing resources may include a number and/or type of computing nodes, a minimum and/or maximum number of computing nodes to use, a usage period for the computing nodes, a usage period during which availability of the computing nodes is to be guaranteed, an expiration time for the request, etc. The request may specify that only a certain user (or users) be granted access to the computing nodes during the usage period or that only a certain program (or programs) be executed on the computing nodes during the usage period. The request may indicate that certain users are to be denied access to the computing nodes during the usage period. The request for computing resources may include other types of preferences, requirements, and/or restrictions (e.g., amount of storage capacity or network bandwidth, geographical and/or logical location for the nodes, termination criteria, etc.).

The request for computing resources may specify a usage period for the computing resources. The usage period may be specified in various manners in various embodiments. For example, the usage period may indicate a specified duration of time (e.g., a number of hours, days, weeks, months, years, etc.) beginning at an initial time and ending at an expiration time. The initial time and/or expiration time may include time of day (e.g., 7:00 a.m.) and date (e.g., Jan. 23, 2010). The initial time can be at some future time, for example, one or more hours, days, weeks, or years in the future. In some cases, the future usage period may begin later than the time of the request (or confirmation of the request) by at least a certain period of time such as, e.g., by at least one hour, one day, one week, one month, or more in the future.

In some implementations of the capacity request manager 130, a delay period may occur between a time that a request for computing capacity is received by the capacity request manager 130 and a time that the request is granted or a time that a confirmation is provided to the user. For example, the delay period may occur due to various processing operations, management operations, accounting operations, etc. performed by the capacity request manager 130 or the program execution service 100. In some such implementations, the requested usage period refers to a time period that occurs after (or substantially after) such delay periods are taken into account. For example, in certain implementations, the delay period may be seconds, minutes, or a few hours. In certain such implementations, the initial time of a requested future usage period may be a time in the future that exceeds such a delay period. The initial time in certain other implementations of the capacity request manager 130 may be the time at which the user's request is submitted, received, or granted by the program execution service 100.

In some cases, the request may indicate that the usage period is not to expire until specifically terminated by the user (e.g., there may be no set expiration time). The duration may be in a range from one hour to one week, one week to one month, one or more months, one or more years, or some other duration. In some embodiments, the usage period may include a combination of the above (or other) factors to provide the user with a high degree of flexibility in scheduling available computer resources.

After the request for computing nodes is received by the capacity request acquisition module 204, the resource scheduling module 208 can schedule and allocate computing nodes to fulfill the request. For example, after receiving a request for a certain number of computing nodes, the resource scheduling module 208 may determine one or more computing nodes 112 to use. In some embodiments, the determination of the computing nodes 112 to be used is performed at the time of the request even if the request is for future availability. In other embodiments, the determination of the allocated computing nodes is deferred to a later time such as, e.g., prior to the beginning of the usage period so that the determination can be based at least partly on information that is then available.

The resource scheduling module 208 may allocate one or more computing nodes from the computing nodes 112 for guaranteed availability by the user during a requested usage period. In some embodiments, one or more specific computing nodes 112 (e.g., one or more specific physical computing nodes 116 and/or virtual computing nodes 120) are allocated for priority use by the user (or authorized users) for the entire usage period.

In other embodiments, rather than allocate specific computing nodes to a specific user for the usage period, the resource scheduling module 208 may instead allocate computing nodes from a computing node pool. The computing node pool may include an appropriate amount of computing nodes with sufficient resources to satisfy requests for program execution by the user or authorized users. In some such embodiments, after a request is received during the usage period to execute one or more programs, an appropriate amount of computing nodes sufficient to execute the one or more programs may be selected from the computing node pool, and program execution is initiated on the selected nodes. After the selected amount of computing nodes are no longer used for executing the request (e.g., after termination and/or completion of the requested execution), those computing nodes may be returned to the computing node pool for use by the user or other authorized users during the usage period. In some implementations, nodes of the computing node pool are allocated for dedicated, exclusive, or preferential use by the user (or authorized users). In some such implementations, nodes of the computing node pool that are not in use by the user (or authorized users) may be allocated to other users for program execution, and if such nodes are needed by the user (or authorized users) to fulfill the capacity guarantee, the other user's program can be terminated.

During the usage period, the user (or authorized users) may submit requests to the capacity request manager 130 for execution of one or more programs on the computing nodes. Requests for program execution may include various information to be used in the initiation of the execution of one or more programs, such as an executable or other copy of a program to be executed, an indication of a program that was previously registered or otherwise supplied for execution, and a number of instances of the program that are to be executed simultaneously (e.g., expressed as a single desired number of instances, as a minimum and maximum number of desired instances, etc.). The request may specify a number and/or type of computing nodes for execution of a program, a minimum and/or maximum number of computing nodes to use, an expiration time for the request, a preferred execution time and/or time period of execution, etc. The request may include other types of preferences and/or requirements for execution of one or more programs (e.g., resource allocation, geographical and/or logical location for execution, proximity of execution to other programs and/or computing nodes, timing-related criteria, termination criteria, etc.).

The resource scheduling module 208 may determine which of the computing nodes to use for execution of each program instance in a variety of ways, including based at least partly on any preferences, restrictions, and/or requirements specified in the request or otherwise specified for the program and/or associated user. For example, if criteria are determined for preferred and/or required resources for execution of a program instance (e.g., memory and/or storage; CPU type, cycles or other performance metric; network capacity; platform type, etc.), the determination of an appropriate computing node to execute a program instance may be based at least in part on whether a computing node has sufficient resources available to satisfy those resource criteria.

During the usage period, requests received by the capacity request acquisition manager 204 to execute programs on behalf of the user or authorized users on the computing nodes may result in initiation of program execution on one or more of the allocated computing nodes. In some cases, sufficient requests for program execution may be received during the usage period such that all of the computing nodes are in use (e.g., executing programs). Further requests for program execution received during the usage period may be refused or may be held or queued by the resource scheduling module 208 until one or more of the guaranteed availability computing nodes becomes available. In some embodiments, some requests are probabilistically dropped as the program execution service 100 nears capacity.

In some embodiments, the resource scheduling module 208 may perform one or more management operations with respect to fulfilling requests, such as, for example, enforcing usage period or other restrictions associated with requests, freeing-up computing resources to fulfill the requests, authorizing and/or authenticating the requests and/or the requesting users, etc. For example, in some cases, the request from the user may specify that only a certain user (or users) is authorized to have access to the computing nodes during a usage period. In some cases, the request from the user may specify that only one or more specified programs be executed on the nodes during the usage period. Other restrictions can include restrictions on duration of execution of a program, restrictions on fees incurred during execution of the program, etc. Combinations of one or more of the above restrictions (or other restrictions) may be specified by the user and checked by the capacity request manager 130 before permitting access to the computing nodes.

In some implementations where guaranteed availability computing nodes are provided, after the usage period expires, the resource scheduling module 208 releases the guaranteed availability computing nodes (e.g., dedicated computing nodes or nodes in a computing node pool) for use by others. In some such implementations, programs that are executing when the usage period expires are terminated. In other implementations, such executing programs are not terminated and are allowed to continue execution until a higher priority user requests access to the computing node.

In the embodiment illustrated in FIG. 2A, the monitoring and reporting module 212 monitors and tracks usage of the computing nodes during one or more usage periods and reports information and statistics on the usage to the user. For example, the monitoring and reporting module 212 may track usage patterns of users executing programs on the computing nodes. Usage patterns can include the number or identity of users accessing the nodes, the start/end times and durations of program execution, and/or other user-specified patterns or diagnostics. In some such embodiments, the monitoring and reporting module 212 may provide interactive feedback to the user including, e.g., indications of when and/or for how long programs may be likely to execute on the computing nodes, actual or predicted demand for the nodes, etc. In some embodiments, the monitoring and reporting module 212 can generate a report detailing or summarizing the usage statistics and communicate the report to the user via electronic mail or provide access to the report, usage statistics, or interactive feedback via Web services.

Some program execution services 100 may be fee-based such that the service executes programs or allocates computing resources on behalf of a user in exchange for payment of one or more fees by that user. In some fee-based services, the capacity request manager 130 may optionally include the billing module 216 schematically illustrated in FIG. 2A. For example, in some embodiments, fees may be charged to a user based at least partly on an amount and/or type of program execution capacity allocated for executing one or more programs on behalf of a user, such as based at least partly on one or more of a number of processing units, an amount of memory, an amount of storage, an amount of network resources, a priority level for the request, etc., allocated for executing programs of the user. In some embodiments, fees may be based at least partly on other factors, such as various characteristics of the computing resources used to execute programs, such as, for example, based at least partly on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc.

Fees may be based at least partly on various other factors, such as related to requests for program execution capacity and/or various properties related to executing programs (e.g., continuity of execution, fault tolerance, etc.), or requests for guaranteed availability. In at least some embodiments, a program execution service may offer one or more of various tiers, types and/or levels of services or functionality for executing programs on behalf of multiple users, and in some such embodiments, various fees may be associated with the various tiers, types and/or levels of services. The billing module 216 can monitor and track usage of the computer resources and calculate fees due for the usage.

The user may be charged a fixed fee payment (e.g., upfront or periodically billed) for requesting computing capacity and, in some cases, is charged other use fees (e.g., variable fees associated with use of various resources, such as electricity, physical rack space, network utilization, etc.). As an example, a user who makes a request for computing resources during a usage period may be charged a reservation fee when the request is made or when the request is granted by the program execution service 100. The reservation fee may be based at least partly on, for example, the amount of resources requested, the start time and/or duration of the usage period, whether the service will be required to purchase additional computing hardware to fulfill the request, etc. For example, the reservation fee may be higher if the start time is in the near future than if the start time is farther out. In addition, the user (or authorized users) may be charged a usage fee for utilizing the resources during the usage period. For example, an authorized user that requests, during the usage period, execution of a program on the computing nodes, may be charged a usage fee based at least partly on, for example, the duration of execution of the program, the type of the resources used to execute the program, etc. As discussed above, various types or tiers of fee arrangements are possible. For example, a user that requests on-demand resources for immediate use may not be charged a reservation fee but may be charged a higher usage fee than that charged to users that pay a reservation fee to make a reservation for resources for future usage periods.

The billing module 216 may track the usage, calculate appropriate fees, and bill the user and/or the authorized user (or provide billing information to an accounting module or service). In some cases, the request by the user may indicate that some or all of the usage fees incurred by authorized users be billed to the user rather than to the authorized users. In some such cases, the billing module 216 may appropriately portion the fees among the user and authorized users.

The capacity request manager 130 can be configured differently than illustrated in FIG. 2A. For example, various functionalities provided by the illustrated modules can be combined, rearranged, added, or deleted. In some embodiments, additional or different processors or modules may perform some or all of the functionalities described with reference to the example embodiment illustrated in FIG. 2A. Many implementation variations are possible.

Although described generally in terms of management of program execution capacity, in other embodiments, the capacity request manager 130 can be configured to manage additional or alternative types of computing-related resources for use by multiple users and to provide flexible guarantees for availability of these computing-related resources. These resources may include one or more of the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; non-network bandwidth; input device capabilities; output device capabilities; CPU cycles or other instruction execution capabilities; IP addresses or other network identifiers; etc.

Figure 2B:
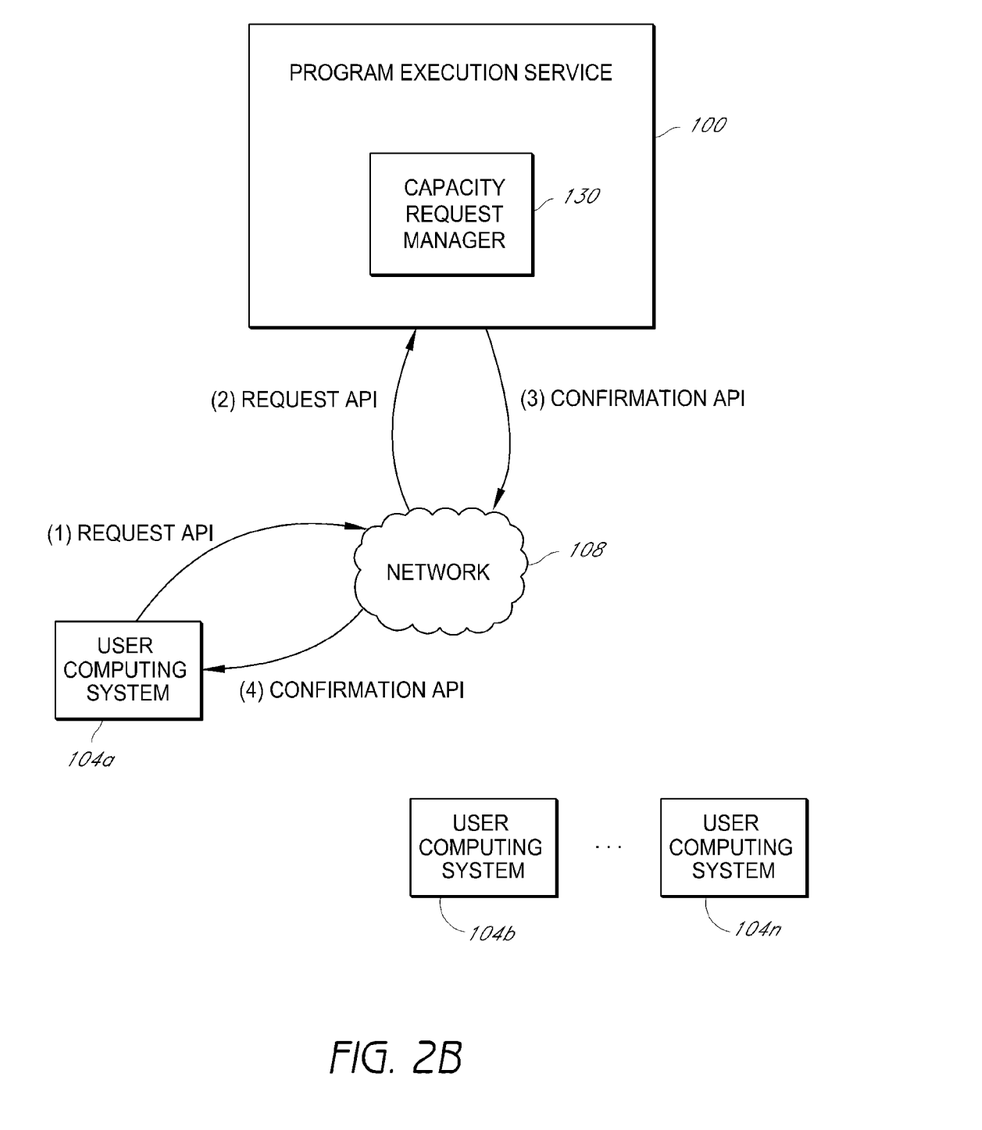
FIG. 2B is a network diagram schematically illustrating an example interaction between a user computing system and a capacity request manager of a program execution service.

FIG. 2B is a network diagram schematically illustrating an example interaction between a user computing system 104a and a capacity request manager 130 of a program execution service 100. The program execution service 100 can provide computing resources to multiple user computing systems 104a, 104b, . . . , 104n. In this illustrative example, the program execution service 100 provides an API for the user computing systems 104a, 104b, . . . , 104n to programmatically interact with the capacity request manager 130. FIG. 2B illustratively shows the user computing system 104a communicating a request for computing resources using a request API. The request API (1) is communicated via the network 108 and (2) is received by the capacity request manager 130 of the program execution service 100. The request API can include information about the user's request such as, e.g., the number and/or type of computing nodes, a minimum and/or maximum number of computing nodes to use, a usage period during which availability of the computing nodes is to be guaranteed, an expiration time for the request, etc. The request API can include other information about the request such as, e.g., preferences, requirements, and/or restrictions related to the user's needs for the guaranteed availability computing resources. For example, the request API can include information on which users are to be granted access to the computing resources during the usage period, which program (or programs) can be executed during the usage period, an amount of storage capacity or network bandwidth, geographical and/or logical location for the nodes, termination criteria, etc.

In the example shown in FIG. 2B, the capacity request manager 130 communicates a confirmation API (3) via the network 108 which is (4) received by the user computing system 104a. The confirmation API can include information related to whether the program execution service 100 can grant the request (in whole or in part) during the requested usage period (or during a different usage period). For example, if the service 100 is near capacity, the service may begin denying at least some requests and may use the confirmation API to notify the user that their request is denied. The notice provided to the user can include additional information, such as an expected time when the request can be fulfilled or a message directing the user to resubmit the request after a passage of a period time. The confirmation API may also include one or more request identifiers (e.g., keys, tokens, user names, passwords, etc.) that are associated with the user's request and that are to be used in conjunction with accessing the guaranteed availability computing resources during the usage period. The confirmation API can include other information such as, e.g., information confirming that the user's preferences, requirements, and/or restrictions can be met.

FIG. 2B illustratively shows the user computing system 104a programmatically interacting via the API with the capacity request manager 130 of the program execution service 100. The program execution service 100 can receive requests for the service's computing resources from other user computing systems (e.g., user computing systems 104b, . . . , 104n) via the API and can communicate confirmations to the other user computing systems via the API (such requests and confirmations are not shown in the illustrative example in FIG. 2B). The capacity request manager 130 (or other suitable component) can schedule the requests from multiple user computing systems and can allocate guaranteed availability computing resources during the various requested usage periods. Other types of programmatic interactions (additionally or alternatively) between the program execution service 100 and the user computing systems are possible. For example, a request can be received directly from a user (e.g., via an interactive console or other GUI provided by the program execution service), from an executing program of a user that automatically initiates the execution of other programs or other instances of itself, etc.

Figure 3:
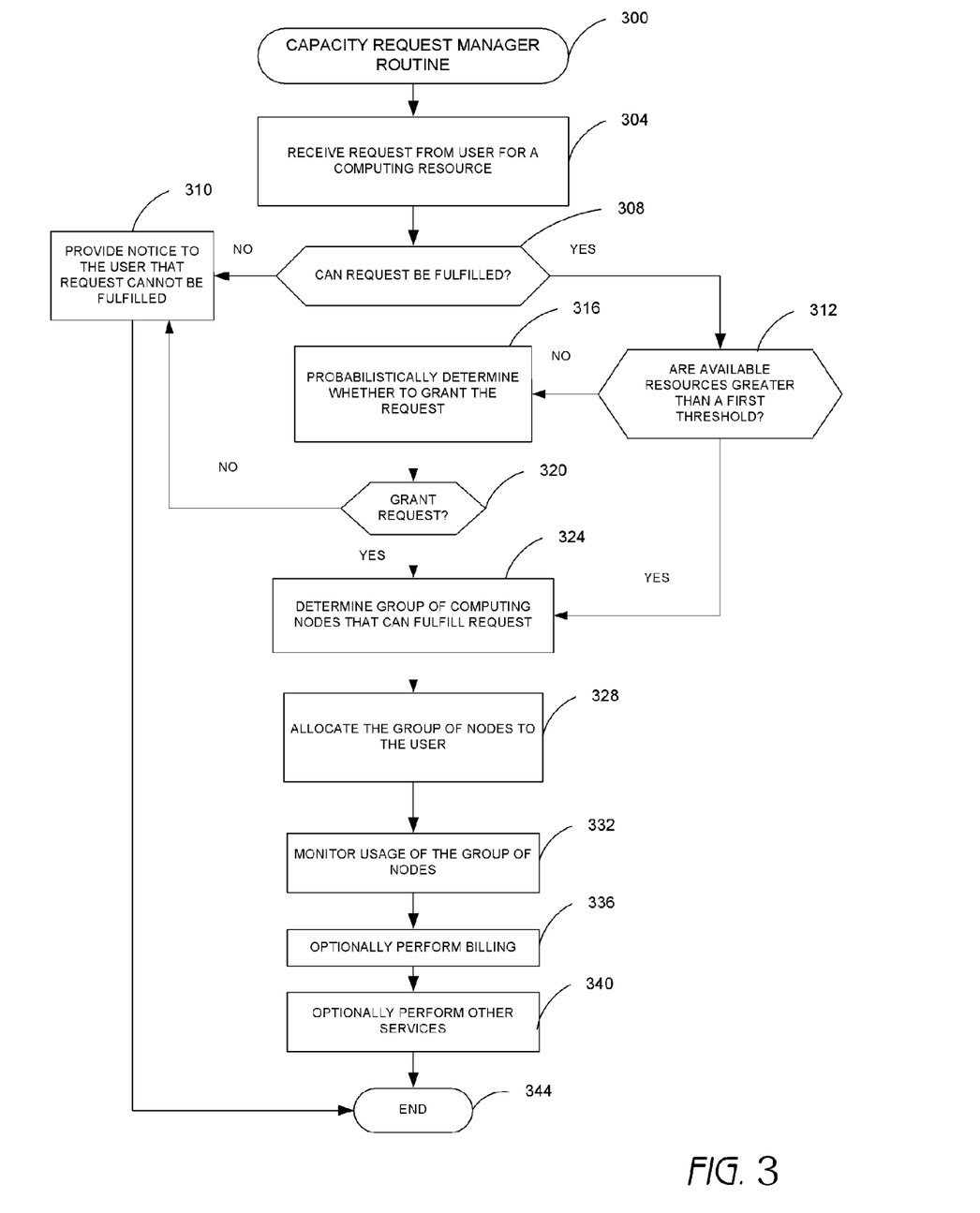
FIG. 3 is a flow diagram schematically illustrating a capacity request manager routine implemented by a capacity request manager component.

FIG. 3 is a flow diagram that schematically illustrates an example embodiment of a capacity request manager routine 300. In some implementations, the routine 300 can be provided by embodiments of the capacity request manager 130 of the program execution service 100 described with reference to FIGS. 1 and 2. The example routine 300 is described in terms of a user that makes a request for program execution capacity, e.g., computing nodes, during a usage period. The example routine 300 is intended to illustrate, but not to limit, various aspects of the capacity request manager 130.

With reference to FIG. 3, at block 304, a request is received by the capacity request manager 130 from the user for a guarantee of program execution capacity by the program execution service 100 in a future usage period. As discussed above, the request for computing resources may include a number and/or type of computing nodes, a minimum and/or maximum number of computing nodes to use, a future usage period during, an expiration time for the request, a request for guaranteed availability, etc. The request may specify that only a certain user (or users) be granted access to the computing nodes during the usage period or that only a certain program (or programs) be executed on the computing nodes during the usage period. The request for guaranteed availability may include other types of preferences, requirements, and/or restrictions (e.g., amount of storage capacity or network bandwidth, geographical and/or logical location for the nodes, termination criteria, etc.).

At block 308, the capacity request manager 130 determines whether the request can be fulfilled. For example, the program execution service 100 may have sufficient capacity to meet the request or the usage period is sufficiently far in the future that the program execution service can acquire (if needed) sufficient computing capacity to satisfy the request for the specified amount of computing capacity prior to the requested usage period. In one embodiment, if the request can be fulfilled, confirmation that the request can be fulfilled can be provided to the user. For example, a message may be communicated to the user via electronic mail, or the program execution service may provide the confirmation via Web services or via an interactive console or other GUI provided by the program execution service. The confirmation may be provided via a confirmation API as discussed with reference to FIG. 2B.

If the request cannot be fulfilled, in whole or in part, the routine 300 continues to block 310 where the capacity request manager provides a notice to the user that the request cannot be fulfilled as requested. The notice can include information on an expected time when the request has a higher chance of being fulfilled (e.g., when additional computing nodes become available) or can direct the user to resubmit the request after a time period passes. For example, if the average running time for a request is 30 minutes, then the notice can direct the user to resubmit the request in 30 minutes, when currently running tasks are likely to have completed. The time period can be an arbitrary time, for example, the user can be directed to submit after 5 minutes, 10 minutes, 15 minutes or other time period. If the request is granted probabilistically and if some capacity is available, the request may be granted at during any one of the subsequent requests. The notice may be communicated to the user via electronic mail, or the program execution service may provide the information via Web services or via an interactive console or other GUI provided by the program execution service. The information may be provided via an API (see, e.g., FIG. 2B). The user can use the information to resubmit a new request if desired. After block 310, the routine 300 ends at block 344.

If the request can be fulfilled, the routine 300 continues to block 312 where it determines whether available resources are greater than a first threshold. In one embodiment, the first threshold corresponds to a low resource usage level for the program execution service 100, such that excess capacity exists for multiple requests. The first threshold can be any number or level and may be set by an administrator of the program execution service 100. If the available resources are less than or equal to the first threshold, then the routine 300 continues to block 316. If the available resources are greater than the first threshold, the routine 300 continues to block 324.

For example, in one embodiment, the first threshold can correspond to utilization level of 50% of the program execution service 100 and if the current available resources are more than 50%, then the request is granted. However, if the available resources are less than or equal to 50%, then the program execution service 100 probabilistically grants the request.

In one embodiment, the capacity request manager 130 uses a second threshold to determine whether to deny a request. For example, the second threshold can correspond to the full utilization of the program execution service 100 or to level where the program execution service 100 is almost fully utilized except for a reserve level maintained by the program execution service 100. In one example, the program execution service may maintain a 10% reserve capacity and set the second threshold at 90%. In one embodiment, the reserve capacity corresponds to the outstanding guaranteed availability of computing nodes, which allows the program execution service 100 to fulfill its provided capacity guarantees, if any. Checking using the second threshold level can be performed, for example, at block 310 or at block 308.

In some embodiments, the capacity request manager 130 may not perform block 312. For example, the capacity request manager 130 may grant all requests probabilistically, regardless of the amount of excess capacity available.

As will be apparent, the first and second threshold can be set to any level based at least partly on the desired behavior for the program execution service 100. In some embodiments, the thresholds may be adaptively set based at least partly on the expected load, current load, current time or other parameters. Further, the behavior of the capacity request manager 130 when a level is equal to a threshold can be either of the options. For example, in block 310, if the available resources are equal to the first threshold, the routine 300, in one embodiment, can proceed to block 324 rather than 316.

At block 316, the capacity request manager 130 probabilistically or statistically determines whether to grant the request (or in some implementations, to deny the request). The determination may be based at least partly on the amount of available resources. For example, if available resources are very limited, then the probability of denying a request can be high, while if the resources are available in greater numbers, the probability of granting a request can be relatively higher. In one embodiment, at least some requests are granted while at least some requests are denied; the denial or grant may be based at least in part on the available computing resources. Other criteria may also be used to determine probability, such as, for example, the priority associated with the request and/or the user. The capacity request manager 130 may use a probability function to determine the probability of granting or denying the request.

As discussed above, the capacity request manager 130 may use a weighted probability function to determine whether to grant or deny a request. Particular requests may be given a higher probability of being approved relative to other requests based at least partly on the characteristic of the request or the requestor, such as the trustworthiness of the requestor or the value of the business relationship with the requestor. For example, some users may have purchased quality of service agreements, purchased guaranteed capacity, requested capacity for execution of fee-based programs rather than free or demonstration programs, may have made future commitments to purchase extra capacity, or otherwise provided a higher priority relative to other customers. User data, such as payment history, usage history, amount of computing resources previously requested, user behavior, compliance with program execution service policies, user agreements with the program execution service, or other data associated with the user may be used by the program execution service 100 in determining a priority level for that user. Some users may be provided higher priority due to the value of their business relationship with the program execution service. For example, some users may be strategic partners or are businesses or divisions associated with the program execution service (e.g., branch office, department, subsidiary or parent corporation). Users may be categorized into any number of priority tiers, with higher tiers having higher probabilities of getting their request approved.

In some embodiments, the request may be for a period in the future and includes a specified usage period. The capacity request manager 130 may use probabilistic models or other estimation models to determine an expected usage level for the specified time period. The capacity request manager 130 may then probabilistically grant the request based at least partly on the expected usage for the specified time period.

At block 320, the capacity request manager 130 grants or denies the request as determined in block 316. If the request is granted, the routine 300 continues to block 324. If the request is denied, the routine continues to block 310.

If the request can be fulfilled, the routine 300 continues to block 324 where the capacity request manager determines whether a group of computing nodes can fulfill the request. In various embodiments, the determination at block 324 is made at or near the time the request is granted by the program execution service. In other embodiments, the determination at block 324 is made at a later time, e.g., closer to the beginning of a specified usage period, if included, so that the determination of the group of computing nodes can be made based at least partly on information that is then available. The number of computing nodes in the group of computing nodes may, but need not, be different from the number of computing nodes requested by the user. For example, the number of computing nodes in the group may be less than the requested number, because the program execution service has sufficient excess computing capacity in the event that the number of computing nodes actually requested during the specified usage period is greater than the number of computing nodes in the group. In other cases, the number of computing nodes in the group may be greater than the number requested to attempt to ensure that there will be enough computing nodes to safely meet anticipated demand during the usage period (e.g., to provide reserve nodes in case of failure of one or more of the computing nodes in the group). At block 328, the group of computing nodes is allocated to the user. In some situations, the computing nodes are allocated during the specified usage period. As discussed above with reference to the resource scheduling module 208, the allocated group of computing nodes may comprise specific computing nodes or nodes selected from a computing node pool.

The routine 300 continues at block 332 where the capacity request manager monitors and tracks usage of the group of nodes allocated for guaranteed availability. As discussed with reference to the monitoring and reporting module 212, the capacity request manager monitors usage patterns of users (e.g., the second user) executing programs on the guaranteed availability computing nodes. Usage patterns can include the number or identity of users accessing the guaranteed availability nodes, the start/end times and durations of program execution, and/or other user-specified patterns or diagnostics. In some embodiments, at block 332 interactive feedback may be provided to the user including, e.g., indications of when and/or for how long programs may be likely to execute on the guaranteed availability computing nodes, actual or predicted demand for the guaranteed availability nodes, etc. In some embodiments, a report can be generated detailing or summarizing the usage statistics and provided to the user via electronic mail or via an interactive console or other GUI provided by the program execution service.

In embodiments in which the program execution service is fee-based, at block 336 the capacity request manager (or other accounting or billing manager) can calculate one or more fees. For example, the user may be charged a reservation fee for requesting the guaranteed availability computing capacity, and the second user (or second users) may be charged a usage fee for utilizing the guaranteed availability resources during the usage period.

At block 340, optionally other services can be performed by embodiments of the routine 300. For example, various housekeeping operations may be performed including freeing the guaranteed availability computing nodes for use by others after the expiration of the usage period. The routine 300 then continues to block 344 and ends.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system configured to manage execution of programs for users, the system comprising:
    a capacity request manager component that is configured to manage requests for execution of programs for users of a program execution service having a plurality of computing nodes, at least some of the plurality of computing nodes comprising physical computing systems, the capacity request manager component configured to:
        access a request from a user of the program execution service for a specified amount of computing capacity of the program execution service;

determine if sufficient available capacity exists in the program execution service to fulfill the request for the specified amount of computing capacity;

deny the request if insufficient available capacity exists on the program execution service;

grant the request if available capacity on the program execution service is above a first threshold; and probabilistically grant the request if the available capacity is below the first threshold, wherein a probability of granting the request is based at least in part on available capacity and a probability function that is used to determine the probability of granting the request, such that at least some of the requests are denied based at least in part on the probability function, even if available capacity exists;

wherein one or more of the plurality of computing nodes sufficient to provide the specified amount of computing capacity of the program execution service is allocated to the user if the request from the user is granted.

2. The system of claim 1, wherein the probability of granting the request increases when the available capacity increases or decreases when the available capacity decreases.

3. The system of claim 1, wherein the user is a customer of the program execution service and is associated with an account at the program execution service.

4. The system of claim 1, wherein the capacity manager is configured to deny a request if the available capacity is below a second threshold, wherein the second threshold is associated with a desired reserve capacity for the program execution service.

5. The system of claim 4, wherein the desired reserve capacity is sufficient to fulfill outstanding capacity guarantees provided by the program execution service for a particular usage period.

6. The system of claim 1, wherein the capacity request manager component is configured to grant the request for the specified amount of computing capacity if the capacity request manager component determines the program execution service has sufficient current computing capacity to satisfy the request for the specified amount of computing capacity.

7. The system of claim 1, wherein the request includes a requested usage period when the specified amount of computing capacity is desired.

8. The system of claim 1, wherein the capacity request manager component is configured to grant or probabilistically grant the request for the specified amount of computing capacity if the capacity request manager component determines that the program execution service can acquire sufficient computing capacity to satisfy the request for the specified amount of computing capacity prior to a requested usage period.

9. The system of claim 1, wherein the capacity request manager component is configured to provide a notice that the request cannot be fulfilled in whole or in part.

10. The system of claim 9, wherein the notice directs the user to resubmit the request after a period of time.

11. A computer-implemented method for managing requests for computing capacity provided by a program execution service, the method comprising:

under control of a program execution service that provides a plurality of computing nodes that are each configurable to execute one or more programs of multiple users of the program execution service, at least some of the plurality of computing nodes comprising physical computing systems, receiving from a user of the program execution service a request to provide a computing resource associated with one or more of the plurality of computing nodes;

determining availability of the requested computing resource on the plurality of computing nodes; and probabilistically granting the request if the determined availability is below a first threshold, wherein a probability of granting the request is based at least in part on the availability of the requested computing resource and a probability function that is used to determine the probability of granting the request, such that at least some requests to the program execution service are denied based at least in part on the probability function, even if available resource exists.

12. The method of claim 11, further comprising granting the request if the determined availability of the requested resource is above the first threshold.

13. The method of claim 11, wherein granting the request comprises instantiating a virtual machine instance on the program execution service.

14. The method of claim 11, wherein the computing resource comprises at least one of processing capacity, memory capacity, network bandwidth or an IP address.

15. The method of claim 11, further comprising providing a notice to the user that the requested resource is unavailable.

16. The method of claim 11, wherein the request includes a requested period of time having an initial time in the future when availability of the computing resource is desired and an expiration time when availability of the computing resource is desired to end.

17. The method of claim 11, wherein probabilistically granting the request comprises using a probability function to determine whether to grant the request.

18. The method of claim 17, wherein the probability function provides a grant probability, wherein at least over a range of availability of the requested computing resource, the grant probability decreases as the availability of the requested computing resource decreases.

19. The method of claim 18, wherein the probability function comprises a linear function.

20. The method of claim 11, wherein probabilistically granting the request comprises determining a priority for the request, wherein different priorities correspond to different probabilities that the request is granted.

21. The method of claim 20, wherein the priority of the request is based at least partly on one or more of payment history, usage history, age of a user account, amount of computing resources previously requested, user behavior, compliance with program execution service policies, and user agreements with the program execution service.

22. The method of claim 20, wherein the priority of the request is based at least partly on one or more of value of business relationship, purchased quality of service agreements, purchased guaranteed capacity, requested capacity for execution of fee-based programs rather than free or demonstration programs, and future commitments to purchase extra capacity.

23. A system configured to manage requests for computing capacity of a computing service, the system comprising:

a computer memory configured to store one or more program modules for managing requests for computing capacity of a computing service, the computing service comprising a plurality of computing nodes, at least some of the plurality of computing nodes comprising physical computing systems; and a capacity request manager configured to communicate with the computer memory and to execute the one or more program modules stored in the computer memory, the program modules configured to:

receive from a user of the computing service a request to provide computing capacity associated with the plurality of computing nodes of the computing service;

determine whether the request from the user can be fulfilled by the plurality of computing nodes of the computing service; and probabilistically grant the request based at least partly on the availability of the plurality of computing nodes of the computing service and a probability function that is used to determine the probability of granting the request, such that some of the requests are denied based at least in part on the probability function, even if available capacity exists.

24. The system of claim 23, wherein the plurality of computing nodes of the computing service comprise one or more physical computing systems.

25. The system of claim 24, wherein the plurality of computing nodes comprise one or more virtual machines hosted on the one or more physical computing systems.

26. The system of claim 23, wherein the request includes a usage period comprising a start time when the computing resource is requested to be available.

27. The system of claim 23, wherein the requested computing capacity comprises an amount of at least one of: instruction execution capability, volatile memory, non-volatile data storage, network bandwidth, and non-network communication bandwidth.

28. The system of claim 23, wherein the computing service provides an Application Programming Interface (API) for programmatically interacting with the computing service, and wherein the program modules are configured to receive the request from the user for the computing capacity via the API.

29. The system of claim 23, wherein the computing service provides an Application Programming Interface (API) for programmatically interacting with the computing service, and wherein the program modules are configured to provide the information indicative of whether the request by the user can be fulfilled in whole or in part to the user via the API.

30. The system of claim 23, wherein the program modules are configured to grant the request from a second user for computing capacity for a usage period if granting the request from the second user would not exceed the amount of reserved computing capacity guaranteed to be available during the usage period.

31. The system of claim 23, wherein the program modules are further configured to monitor usage of the group of computing nodes reserved by the user.

32. The system of claim 31, wherein the program modules are further configured to provide information related to the monitored usage to the user.

33. A non-transitory computer-readable medium having stored thereon instructions that, when executed by a computer system, cause the computer system to perform operations comprising:

receiving a plurality of computing resource requests for respective amounts of computing resources of a program execution service;

determining that sufficient computing resources are available on the program execution service to fulfill the respective computing resource requests; and based at least in part on the determination, probabilistically denying at least some of the requests and granting at least some of the requests, wherein a probability function is used to determine a probability of granting at least some of the requests, such that at least some of the requests are denied based at least in part on the probability function, even if available resource exists.

34. The computer-readable medium of claim 33, wherein denying at least some of the requests comprises statistically determining a denial probability and utilizing the denial probability to determine whether to deny a request.

35. The computer-readable medium of claim 33, wherein granting at least some of the requests comprises statistically determining a grant probability and utilizing the grant probability to determine whether to grant a request.

* * * * *